(12) United States Patent
Anandayuvaraj et al.

(10) Patent No.: US 9,824,592 B2
(45) Date of Patent: Nov. 21, 2017

(54) METHOD AND APPARATUS FOR ENSURING THE OPERATION AND INTEGRITY OF A THREE-DIMENSIONAL INTEGRATED LOGISTICAL SYSTEM

(71) Applicant: Vinveli Unmanned Systems, Inc., San Antonio, TX (US)

(72) Inventors: Gokul R. Anandayuvaraj, Houston, TX (US); Yuan Qu, Fort Worth, TX (US); Eshan Halekote, San Antonio, TX (US)

(73) Assignee: VINVELI UNMANNED SYSTEMS, INC., Austin, TX (US)

( * ) Notice: Subject to any disclaimer, the term of this patent is extended or adjusted under 35 U.S.C. 154(b) by 157 days.

(21) Appl. No.: 14/861,816

(22) Filed: Sep. 22, 2015

(65) Prior Publication Data
US 2016/0086494 A1  Mar. 24, 2016

Related U.S. Application Data

(60) Provisional application No. 62/053,539, filed on Sep. 22, 2014.

(51) Int. Cl.
| | |
|---|---|
| *G08G 5/00* | (2006.01) |
| *B64C 39/02* | (2006.01) |
| *B64F 1/00* | (2006.01) |
| *B64F 5/60* | (2017.01) |

(52) U.S. Cl.
CPC ......... *G08G 5/0039* (2013.01); *B64C 39/024* (2013.01); *B64F 1/00* (2013.01); *B64F 5/60* (2017.01); *G08G 5/0013* (2013.01); *G08G 5/0026* (2013.01); *G08G 5/0056* (2013.01); *G08G 5/0069* (2013.01); *B64C 2201/128* (2013.01); *B64C 2201/14* (2013.01)

(58) Field of Classification Search
CPC .. G08G 5/0039; G08G 5/0013; G08G 5/0026; G08G 5/0056; G08G 5/0069; B64F 5/60; B64F 1/00; B64C 39/024; B64C 2201/128; B64C 2201/14; G01C 21/20
See application file for complete search history.

(56) References Cited

U.S. PATENT DOCUMENTS

| | | | |
|---|---|---|---|
| 7,813,888 B2 * | 10/2010 | Vian | F41G 7/303 702/1 |
| 8,775,013 B1 * | 7/2014 | Smailus | B64F 5/60 244/190 |

(Continued)

*Primary Examiner* — Calvin Cheung

(57) ABSTRACT

A method for ensuring the operation and integrity of a three-dimensional integrated logistical system that includes a plurality of drones and a plurality of service stations; each of the plurality of drones having a plurality of environmental sensors and a plurality of internal sensors. The plurality of drones is routed to a destination location through a fleet management software that monitors the plurality of drones and the plurality of service stations. The fleet management software is able to detect operational issues amongst the plurality of drones and if necessary reroute the plurality of drones to the plurality of service stations in order to resolve said operational issues. A robotic service unit in each of the plurality of service stations is able to autonomously service the plurality of drones in addition to equipping the plurality of drones with a designated payload.

11 Claims, 16 Drawing Sheets

(56) References Cited

U.S. PATENT DOCUMENTS

| | | | | |
|---|---|---|---|---|
| 8,825,225 B1* | 9/2014 | Stark | ............... | G09F 21/06 |
| | | | | 353/70 |
| 9,307,383 B1* | 4/2016 | Patrick | ............... | H04W 4/22 |
| 9,488,981 B2* | 11/2016 | Pillai | ............... | B64C 39/024 |
| 2009/0219393 A1* | 9/2009 | Vian | ............... | G07C 5/008 |
| | | | | 348/144 |
| 2015/0120126 A1* | 4/2015 | So | ............... | G01C 23/00 |
| | | | | 701/26 |
| 2015/0234387 A1* | 8/2015 | Mullan | ............... | G05D 1/104 |
| | | | | 701/3 |
| 2015/0236778 A1* | 8/2015 | Jalali | ............... | H04W 84/06 |
| | | | | 370/316 |
| 2015/0301529 A1* | 10/2015 | Pillai | ............... | B64C 39/024 |
| | | | | 701/2 |
| 2015/0336671 A1* | 11/2015 | Winn | ............... | B64C 39/024 |
| | | | | 701/3 |
| 2015/0338855 A1* | 11/2015 | Stark | ............... | B64C 39/024 |
| | | | | 701/3 |
| 2015/0346722 A1* | 12/2015 | Herz | ............... | G05D 1/0038 |
| | | | | 701/2 |
| 2016/0144734 A1* | 5/2016 | Wang | ............... | B60L 11/1822 |
| | | | | 701/17 |
| 2016/0244163 A1* | 8/2016 | Peeters | ............... | B64C 19/00 |

\* cited by examiner

METHOD AND APPARATUS FOR ENSURING THE OPERATION AND INTEGRITY OF A THREE-DIMENSIONAL INTEGRATED LOGISTICAL SYSTEM

The current application claims a priority to the U.S. Provisional Patent application Ser. No. 62/053,539 filed on Sep. 22, 2014.

FIELD OF THE INVENTION

The present invention relates generally to unmanned robotic systems and methods of operating the same. More specifically, the present invention is a method and apparatus for ensuring the operation and integrity of a three-dimensional integrated logistical system that includes a plurality of drones.

BACKGROUND OF THE INVENTION

In this document, the phrase "unmanned system" is used to refer to any electrical, mechanical, or biomechanical system that operates at any time without direct human control or with occasional human control, such systems typically being robotic aerial, land, underwater, or space vehicles. In today's colloquial terms, unmanned systems, particularly of the aerial variety, or unmanned air vehicles (UAVs), are referred to as "drones".

Unmanned systems are known to be versatile. The ability of unmanned systems to traverse three-dimensional space makes them ideal for a myriad of applications. While unmanned systems have been historically used for military applications, there has been a recent surge of their usage in civilian applications ranging from sports photography and cinematography, to commercial air surveillance, to domestic policing. However, practical commercial or industrial applications require solutions that involve complex processes, and often times these applications are time-intensive. One single unmanned system, with its very limited amount of operation time due to several limitations, including energy usage, cannot be practically used for commercial and industrial tasks.

For unmanned systems to be practically deployed and used for actual commercial and industrial purposes, several obstacles must be overcome, including two that follow. First, the unmanned systems have to be deployed in a fleet manner, and the fleet must be intelligently managed in order to achieve practical solutions on a commercial or industrial scale. Second, each unmanned system in such a fleet has to be kept operational and self-sustaining (partially or completely) for the majority of its operational cycle. Some applications, such as high risk security surveillance, demand that these unmanned systems be operational in the air (or other medium) twenty-four-seven.

A single integrated logistical system solution is necessary to overcome these two obstacles. Therefore, it is an object of the present invention to provide a method and apparatus for ensuring the operation and integrity of a three-dimensional integrated logistical system that includes a plurality of drones. Each of the plurality of drones is controlled remotely through a fleet management software operated from a control station. The control station is used to direct the plurality of drones to a destination location or to any of a plurality of service stations. Each of the plurality of service stations is equipped with a robotic service unit that allows for service repairs to the plurality of drones and the equipping of payloads to the plurality of drones to be conducted autonomously. Each of the plurality of drones is directed and monitored using a plurality of environmental sensors and a plurality of internal sensors.

DETAIL DESCRIPTIONS OF THE INVENTION

All illustrations of the drawings are for the purpose of describing selected versions of the present invention and are not intended to limit the scope of the present invention.

The present invention is a method and apparatus for ensuring the operation and integrity of a three-dimensional integrated logistical system that includes a plurality of drones. The three-dimensional integrated logistical system of the present invention has a hardware network that is governed by an integrated software system herein referred to as the fleet management software. The hardware network is responsible for the actual servicing of the plurality of drones that moves through three-dimensional space, ensuring that each of the plurality of drones in the fleet is operational for the majority of the time. The fleet management software directs the plurality of drones, as a whole or partially, so that the each of the plurality of drones of the fleet travel safely and efficiently between required locations, ensuring optimal autonomous operation for a myriad of industrial and commercial applications. Additionally, the fleet management software closely monitors the status of each of the plurality of drones, ensuring the integrity of the operational capability of the plurality of drones.

Figure 1:
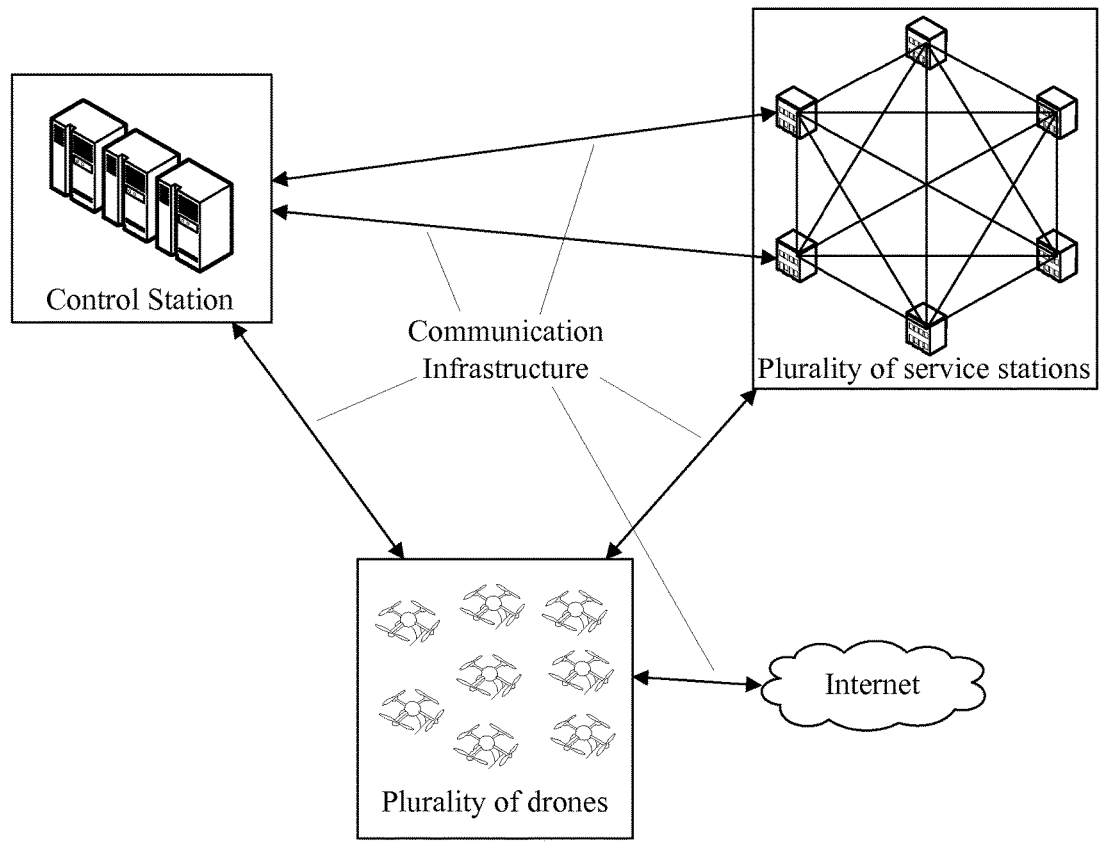
FIG. 1 is a diagram showing the connections of the control station, the plurality of service stations, and the plurality of drones through the communication infrastructure.

In reference to FIG. 1, the hardware network comprises a central control station, a plurality of service stations, and a communication infrastructure. The control station is the infrastructure (e.g., any building at any physical location) that houses the computer/decision-making or information processing system (i.e., a mainframe) of the three-dimensional integrated logistical system. The control station can be a single location or multiple locations, wherein multiple locations of the control station can be identical in performance and importance or broken into primary locations, secondary location, etc. The information processing system of the control station contains the fleet management software, allowing it to intelligently coordinate the autonomous operation of the fleet of unmanned systems and the network of service stations. An entity, such as a person or organization, may use the control station to define commands for the plurality of drones.

The plurality of drones is a group of any number of unmanned vehicles, the unmanned vehicles being any electrical, mechanical, or biomechanical system that operates at any time without direct human control or with occasional human control. Human control encompasses a person or people providing instructions to the unmanned systems through the system of the present invention, which may be real-time. Each of the plurality of drones can be an aerial drone, an aquatic drone, a terrestrial drone, or a space drone depending on the implementation of the present invention.

Figure 13:
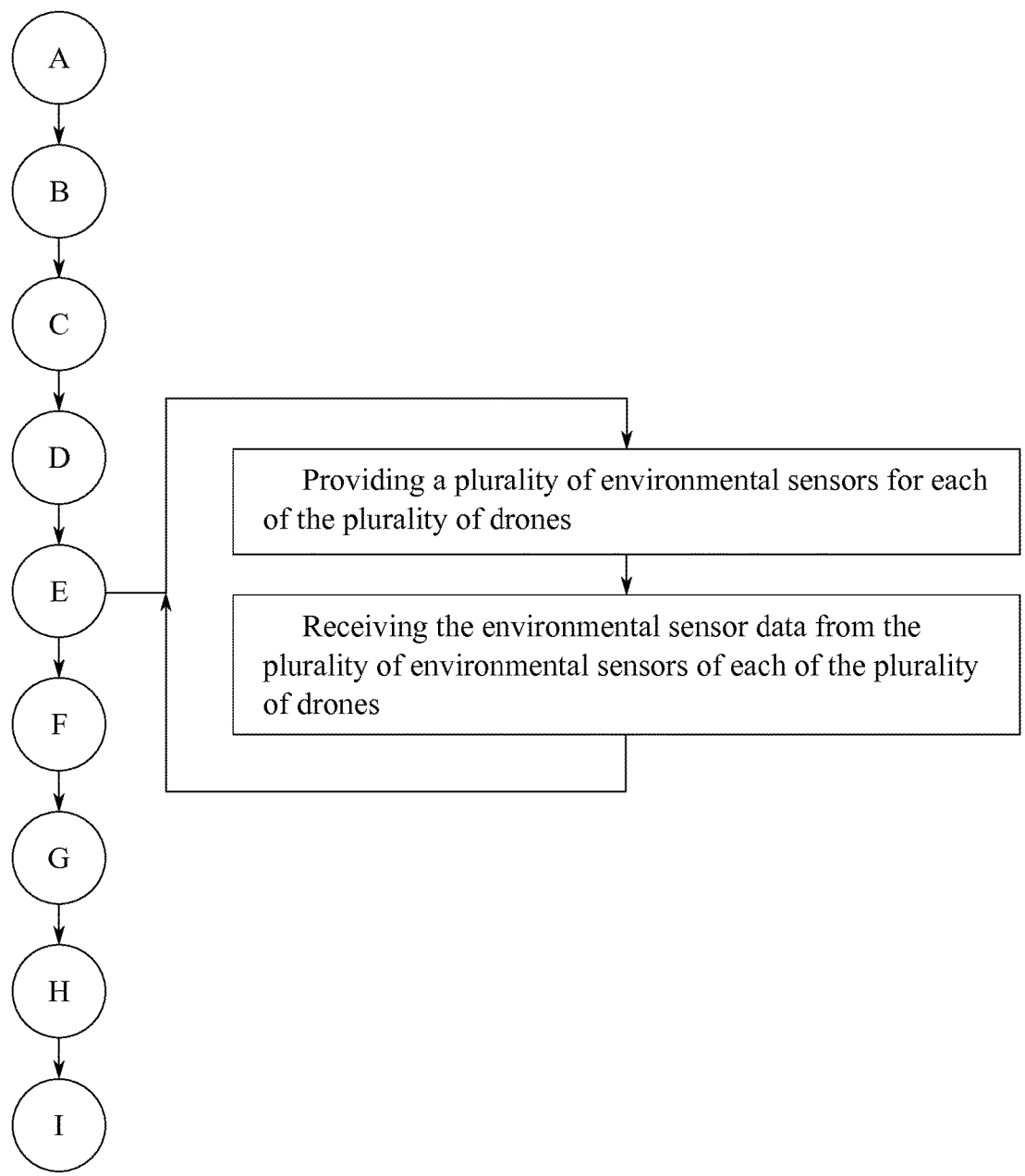
FIG. 13 is a flowchart thereof, depicting the step of receiving the environmental sensor data from the plurality of environmental sensors.
Figure 14:
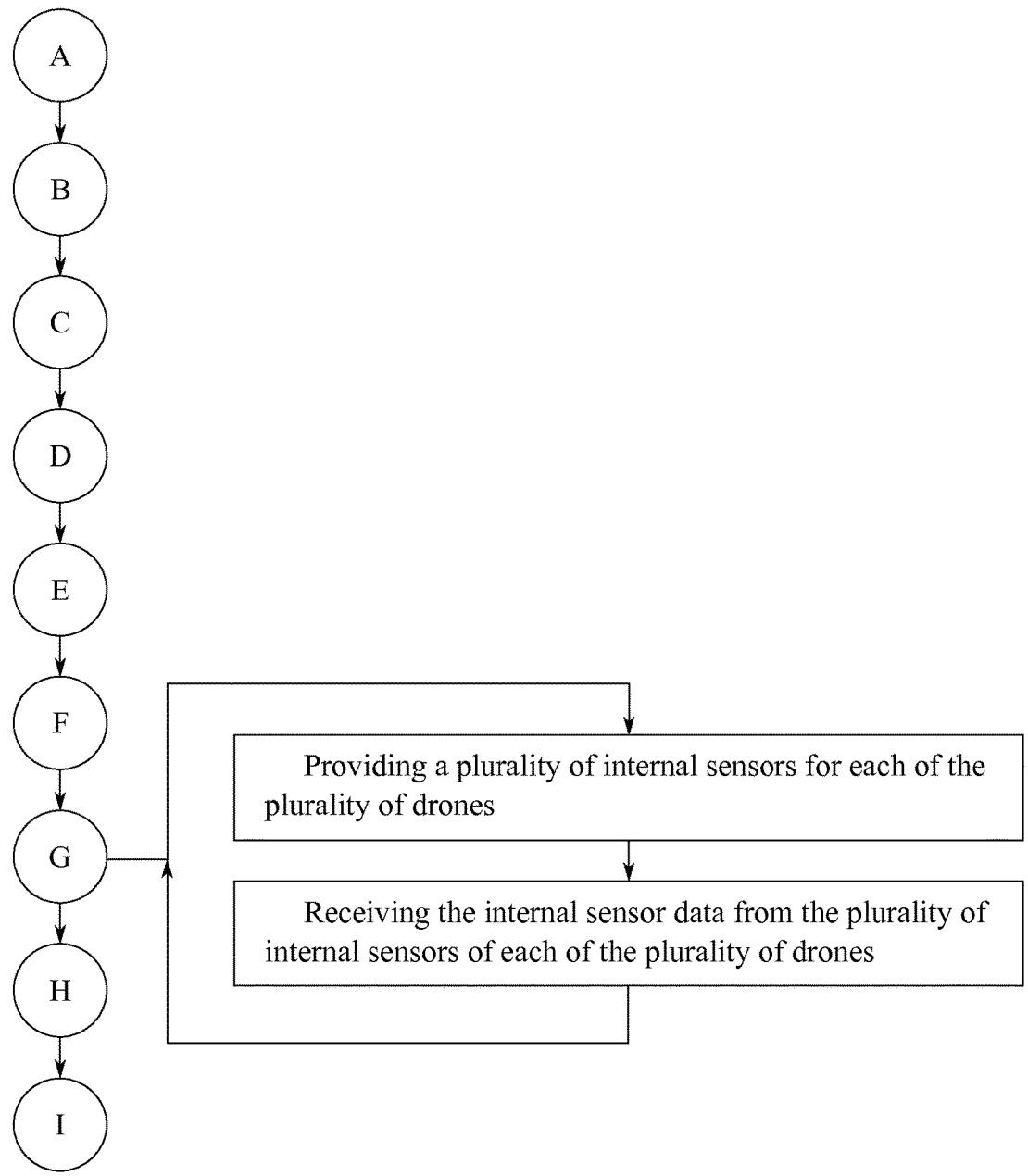
FIG. 14 is a flowchart thereof, depicting the step of receiving the internal sensor data from the plurality of internal sensors.

In reference to FIG. 13-14, each of the plurality of drones comprises a plurality of environmental sensors and a plurality of internal sensors that are used to control and monitor the operation of the plurality of drones. The plurality of environmental sensors gathers information based on light, force, chemical reactions, motion, time, distance, or other factors and provides information that can be used by the control station for any decision-making. Meanwhile, the plurality of internal sensors monitors the operational status of each individual drone, including levels of remaining power/fuel and the functionality of any mechanical or electrical components.

The plurality of service stations is a network of physical locations interspersed throughout a geographic region in which the plurality of drones is to operate. Each of the plurality of service stations may contain a stock of all the necessary replacement components for the repair or general servicing of the plurality of drones. The replacement components may include elements such as fuel sources, devices that transform fuel into kinetic energy, structural components, electronic components, aesthetic components, accessories, sensors, and payloads. When a drone engages with any of the plurality of service stations, said elements can be replaced on, added to, or removed from the drone via a robotic mechanism controlled by the fleet management software as described below.

As previously stated, the plurality of service stations has the means to equip each of the plurality of drones with a payload. A payload may include any physical object that is in possession of one of the plurality of drones, such as fuel, cameras, or packages to be carried for delivery. As such, each of the plurality of drones is equipped with the necessary payload components to handle various types of payloads, such as fuel tanks, mounts, and cargo bays. The specific payload components utilized will vary depending on the particular implementation of the present invention.

As depicted by FIG. 1, each of the plurality of service stations also acts as a communication point, sending information/data to each of the plurality of drones and receiving data from each of the plurality of drones as well. Each of the plurality of service stations is communicably coupled to each other, forming a mesh network, to relay information regarding the plurality of drones. In this way, each of the plurality of drones can easily be redirected if needed or desired.

In reference to FIG. 1, the communication infrastructure enables communication between the control station, the plurality of drones, and the plurality of service stations. The connection between each of the plurality of service stations and the connection between the plurality of service stations and the control station is crucial to ensure that communication is robust and reliable between the different moving parts of the entire three-dimensional integrated logistical system. As such, the communication infrastructure may include wired and wireless connections through land lines, wireless access points, satellite navigation services, location-based services, etc. in order to ensure constant communication between systems.

It is possible for some or all of the plurality of service stations to be directly connected to the control station. When select service stations from the plurality of service stations are connected directly to the control station, the remaining service stations from the plurality of service stations are indirectly connected to the control station through the select service stations with direct connection. Additionally, the control station may communicate with the plurality of drones directly, or indirectly via the plurality of service stations. The plurality of drones may be connected directly to the Internet or other communication networks.

The fleet management software comprises five primary modules that allow for the full or partial autonomy of the hardware network of the three-dimensional integrated logistical system: a fleet routing module, a navigation module, an unmanned system integrity monitoring module, a service station automation module, and a communication module. Each of the five primary modules controls or monitors the plurality of drones, the plurality of service stations, or the communication infrastructure. Furthermore, each of the five primary modules communicates internally with each other to share information and ensure the proper handling of the plurality of drones.

The fleet routing module is responsible for assigning travel routes to the plurality of drones. The fleet routing module takes predefined user input or computer generated data, usually geographic coordinates of locations to be travelled to by the plurality of drones, and calculates possible routes between each of the defined locations. In reference to FIG. 2, when initially determining a navigation route, the fleet routing module receives destination location data for a destination location and starting location data from the plurality of drones; the starting location data indicating the current location of the plurality of drones. The fleet routing module then generates the navigation route using the starting location data and the destination location data, wherein the navigation route is used to direct the plurality of drones to the destination location.

The navigation route contains the data and instructions that inform each of the plurality of drones of the destination location to which the plurality of drones need to travel. When calculating the navigation route, the fleet routing module takes into account the range of mobility of the plurality of drones to ensure that travel to the destination location is attainable. If necessary, the plurality of drones can be directed to service stations prior to the destination location in order to refuel and ensure the arrival of the plurality of drones at the destination location.

Once the fleet routing module generates the navigation route, the fleeting routing module relays the navigation route to the navigation module. The navigation module then distributes the navigation route amongst the plurality of drones. After the plurality of drones has been deployed, the fleet routing module monitors the integrity of the routing. Anomalies, such as system failure, user manual override, and "on-the-fly" modification of the routing, are handled by the fleet routing module to ensure consistent operational performance of the plurality of drones.

After the navigation route has been decided by the fleet routing module, each of the plurality of drones needs navigation support to ensure each of the plurality of drones gets to the destination location. In reference to FIG. 2, in order to provide navigation support, the navigation module receives environmental sensor data from the plurality of environmental sensors of each of the plurality of drones. The navigation module determines the cardinal direction, the velocity, and current location for each of the plurality of drones using the environmental sensor data collected by the plurality of environmental sensors.

In addition to the plurality of environmental sensors equipped on each of the plurality of drones, a subsequent plurality of environmental sensors can be equipped to the control station, the plurality of service stations, or on any other buildings or in any other locations. The subsequent plurality of environmental sensors continuously gathers data in addition to the environmental sensor data gathered by the plurality of environmental sensors of each of the plurality of drones. By increasing the amount of data that is continuously gathered data from a number of locations, the navigation route can be more accurately calculated for each of the plurality of drones.

Figure 2:
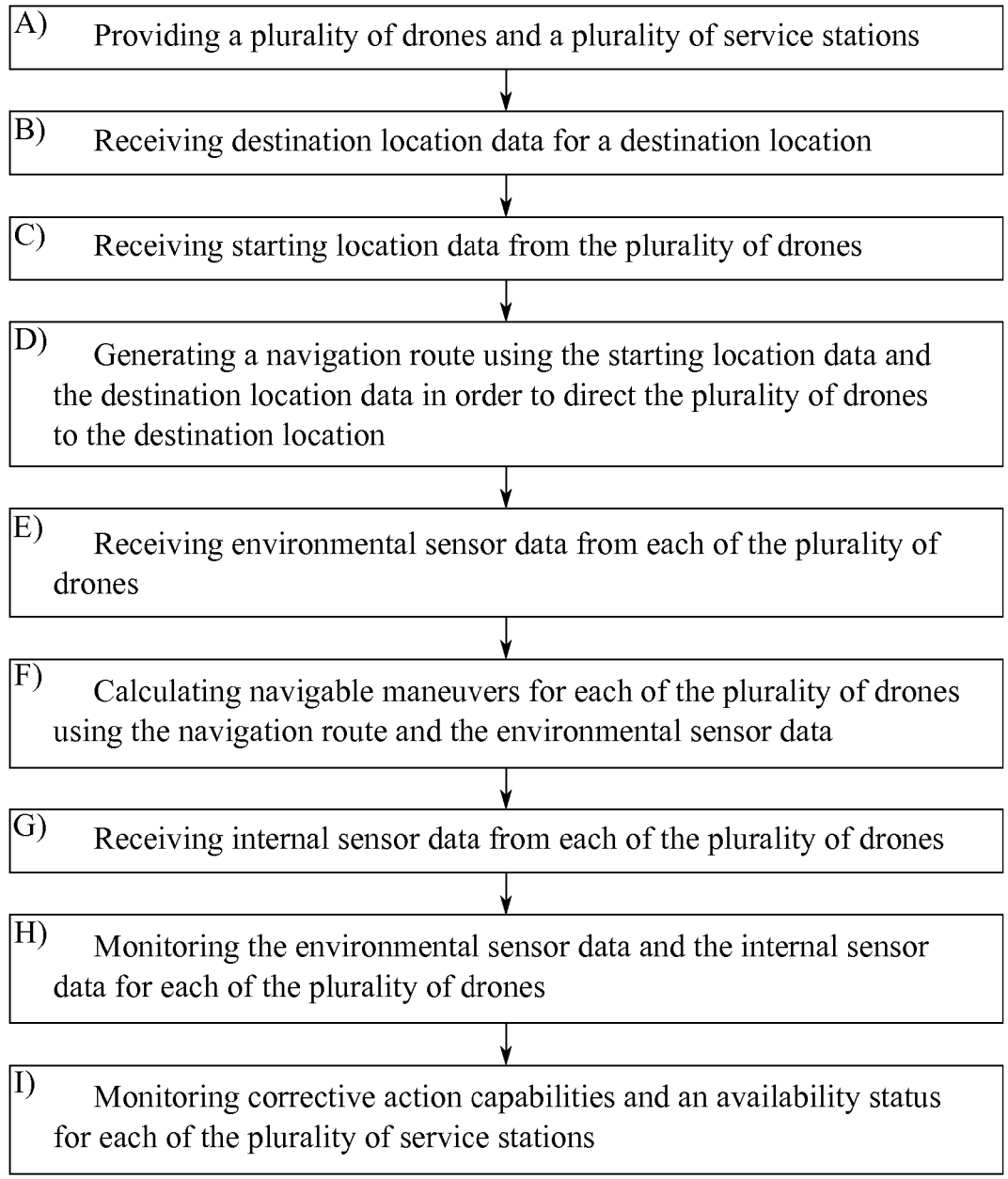
FIG. 2 is a flowchart depicting the steps for directing the plurality of drones to a destination location.

In reference to FIG. 2, the navigation module then uses the environmental sensor data in conjunction with the navigation route from the fleet routing module and determines navigable maneuvers for each of the plurality of drones. The navigable maneuvers determine the operations that each of the plurality of drones must make in order to safely and efficiently travel to the destination location according to the navigation route. Once calculated, the navigation module relays the navigable maneuvers to the plurality of drones. The navigation module continually updates the navigable maneuvers as needed using the environmental sensor data that is continuously collected and updates the plurality of drones accordingly.

In further reference to FIG. 2, the unmanned system integrity monitoring module continually monitors the operational status of the plurality of drones to ensure that tasks are completed at the proper time and at the proper location. The unmanned system integrity monitoring module utilizes the plurality of environmental sensors and the plurality of internal sensors mounted on each of the plurality of drones to monitor fuel/energy levels, environment temperature, velocity, altitude and other parameters to ensure that the each of the plurality of drones is operating normally. The unmanned system integrity monitoring module constantly monitors the environmental sensor data from the plurality of environmental sensors and internal sensor data from the plurality of internal sensors for each of the plurality of drones.

Figure 4:
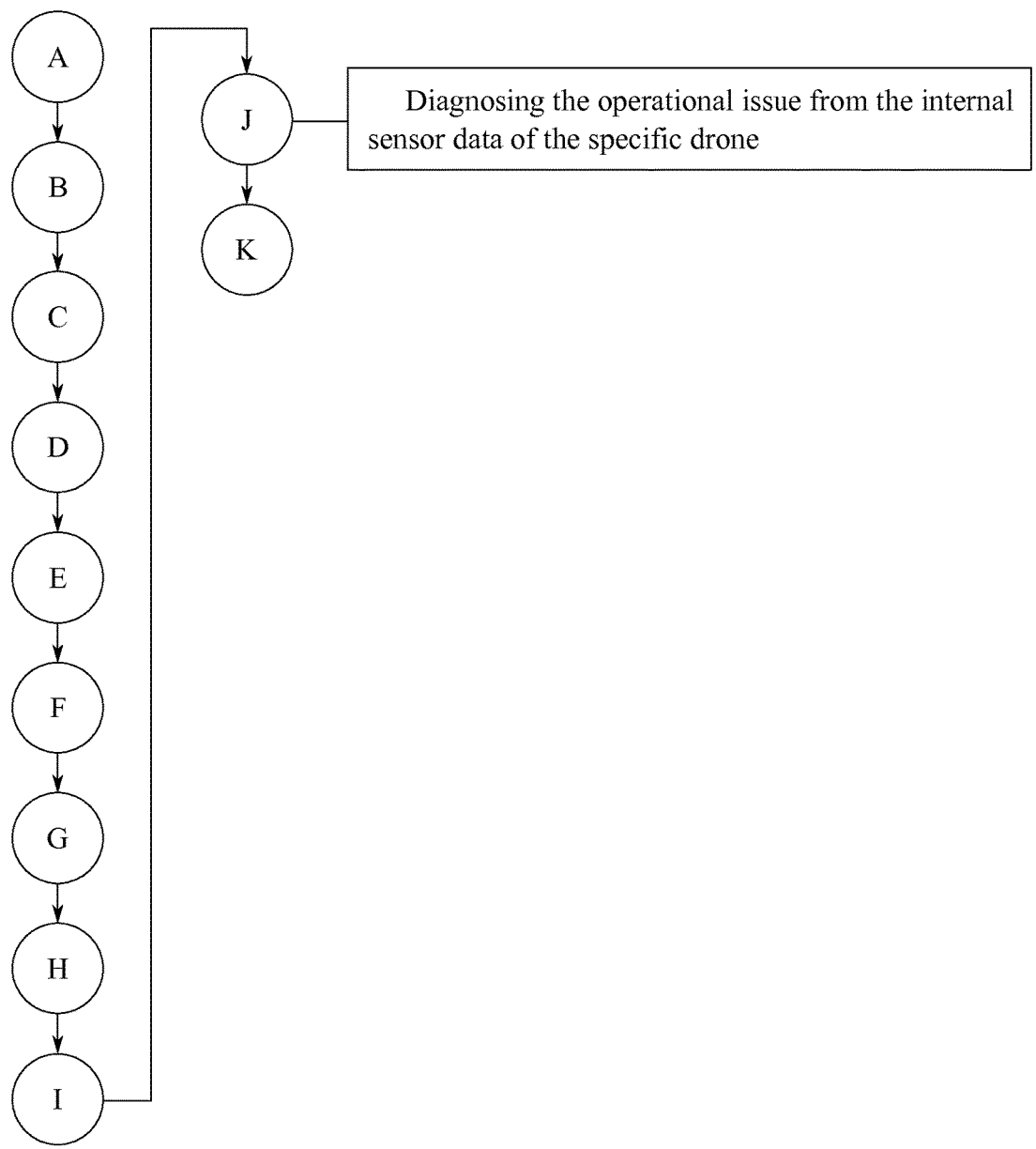
FIG. 4 is a flowchart thereof, wherein the operational issue is detected from the internal sensor data.
Figure 5:
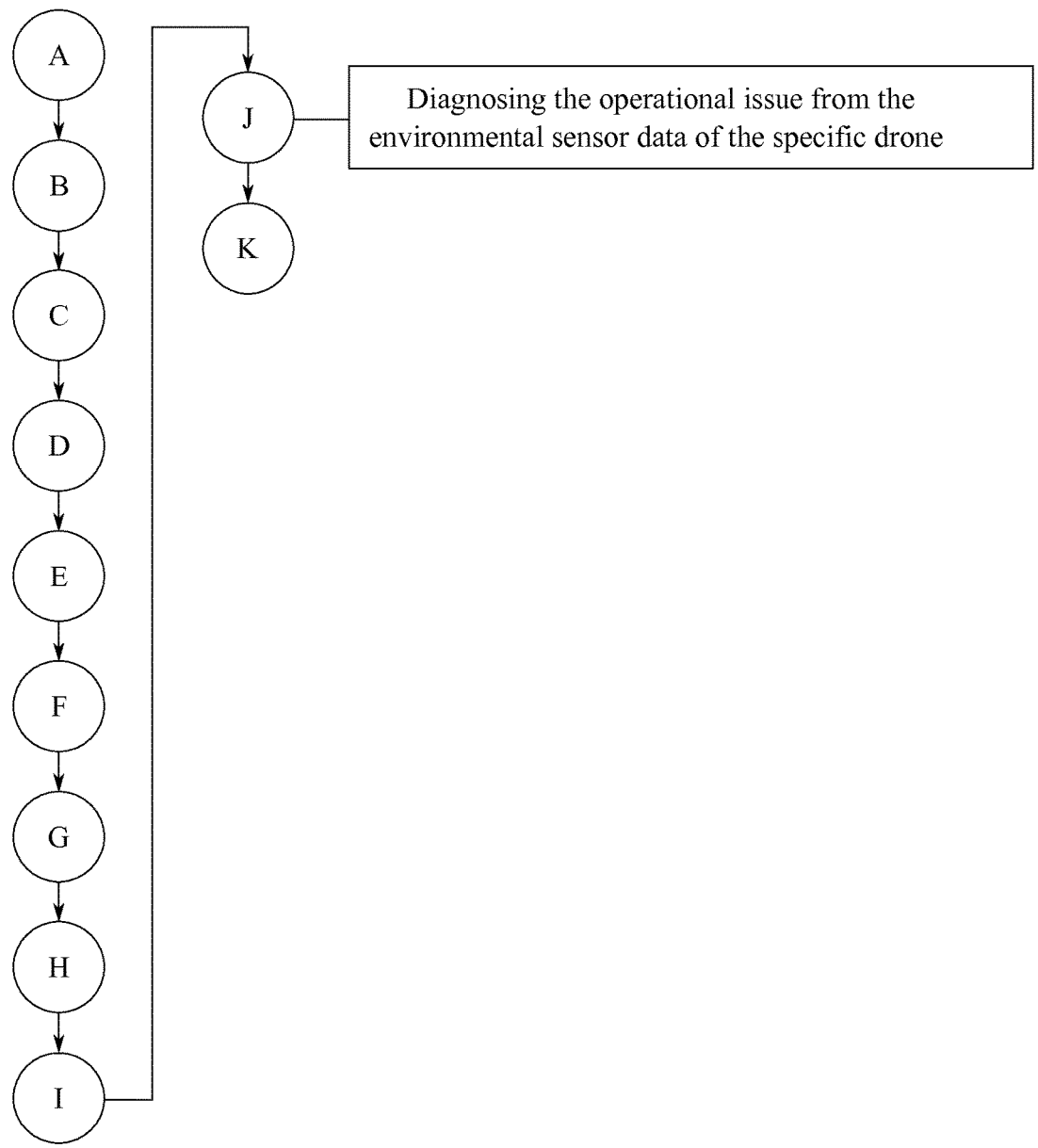
FIG. 5 is a flowchart thereof, wherein the operational issue is detected from the environmental sensor data.
Figure 6:
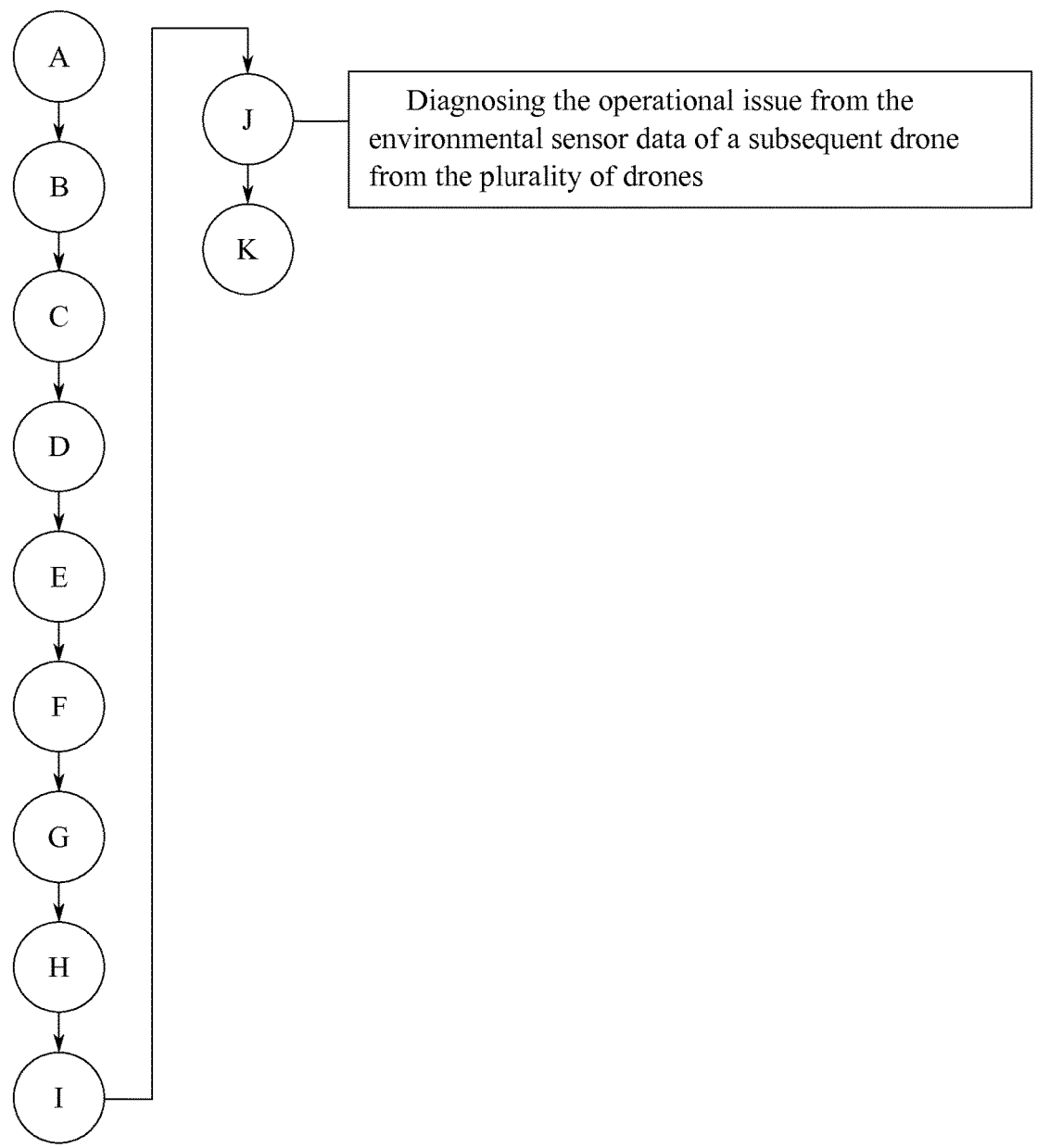
FIG. 6 is a flowchart thereof, wherein the operational issue is detected from the environmental sensor data of a subsequent drone.

If an operational issue is detected for a specific drone from the plurality of drones (e.g. electrical component failures, mechanical component failures, structural component failures, abnormal movements, low fuel or energy levels, and extreme weather conditions), then the unmanned system integrity monitoring module communicates the problem with the fleet routing module. The unmanned system integrity monitoring module can use a number of methods to determine the operational issue. The three primary methods of determining the operational issue are: diagnosing the operational issue from the internal sensor data of the specific drone; diagnosing the operational issue from the environmental sensor data of the specific drone; or diagnosing the operational issue from the environmental sensor data of a subsequent drone from the plurality of drones, as depicted by FIG. 4-6 respectively.

Figure 3:
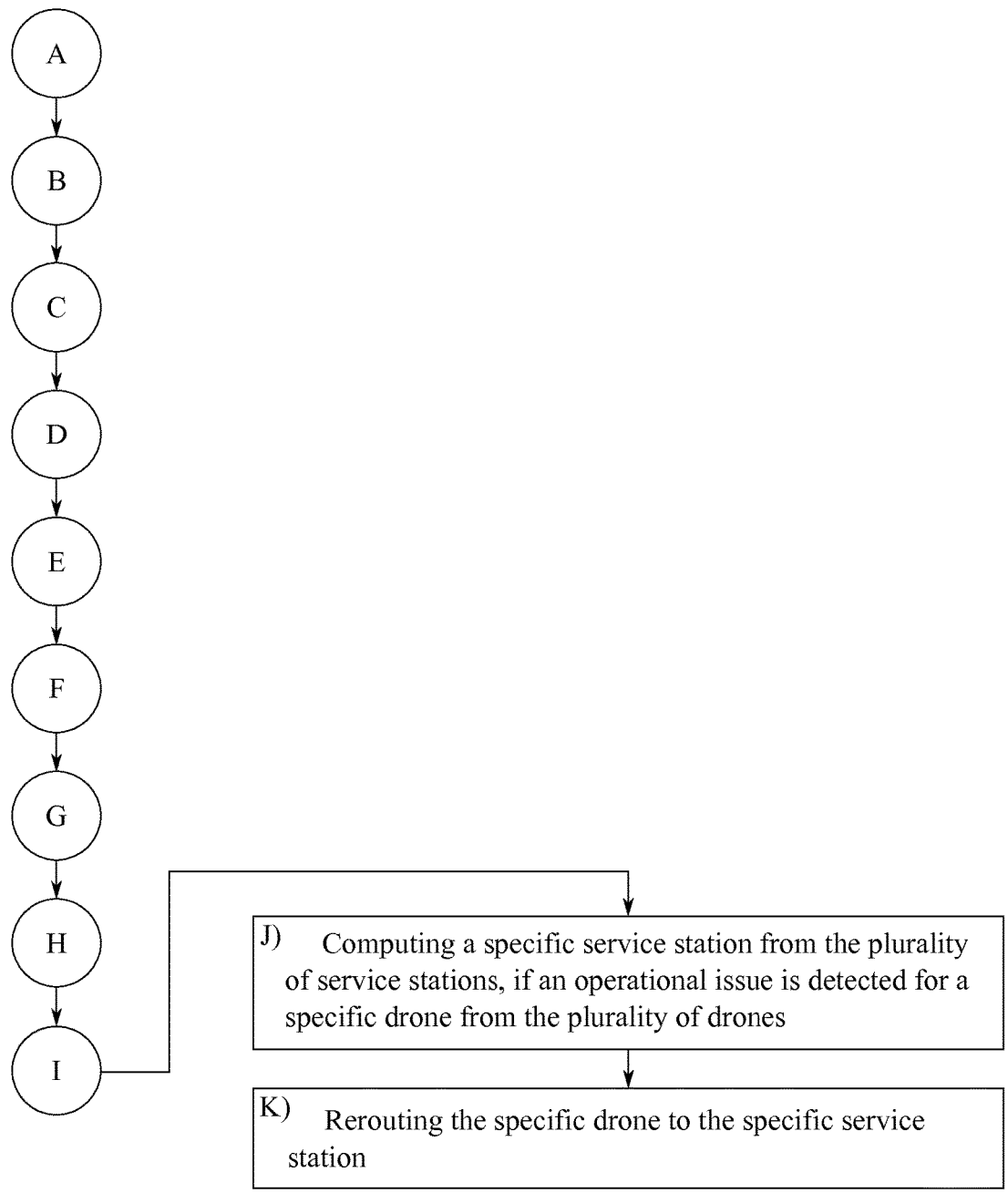
FIG. 3 is a flowchart thereof, depicting the steps for rerouting a specific drone, if an operational issue is detected.

The unmanned system integrity monitoring module analyzes the environmental sensor data and the internal sensor data to determine irregularities in the data that indicate the operational issue. In reference to FIG. 3, as the unmanned system integrity monitoring module determines the operational issue with the specific drone, the fleet routing module computes a specific service station from the plurality of service stations that is available to perform corrective actions. When the specific service station has been targeted, the fleet routing module then reroutes the specific drone to the specific service station for corrective actions and sends a service notification to the specific service station (via the service station automation module as described below) to prepare for the specific drone. The service notification preferably contains a list of required services that need to be performed on the specific drone.

In reference to FIG. 2, the service station automation module monitors corrective action capabilities and an availability status for each of the plurality of service stations. The corrective action capabilities indicates which actions each of the plurality of service stations is able to perform, while the availability status indicates whether or not each of the plurality of service stations is open or has space to accommodate incoming drones. The fleet routing module gathers the corrective action capabilities and the availability status of each of the plurality of service stations, along with service location data for each of the plurality of service stations from the service station automation module; the service location data for each of the plurality of service stations indicating a physical location.

Figure 7:
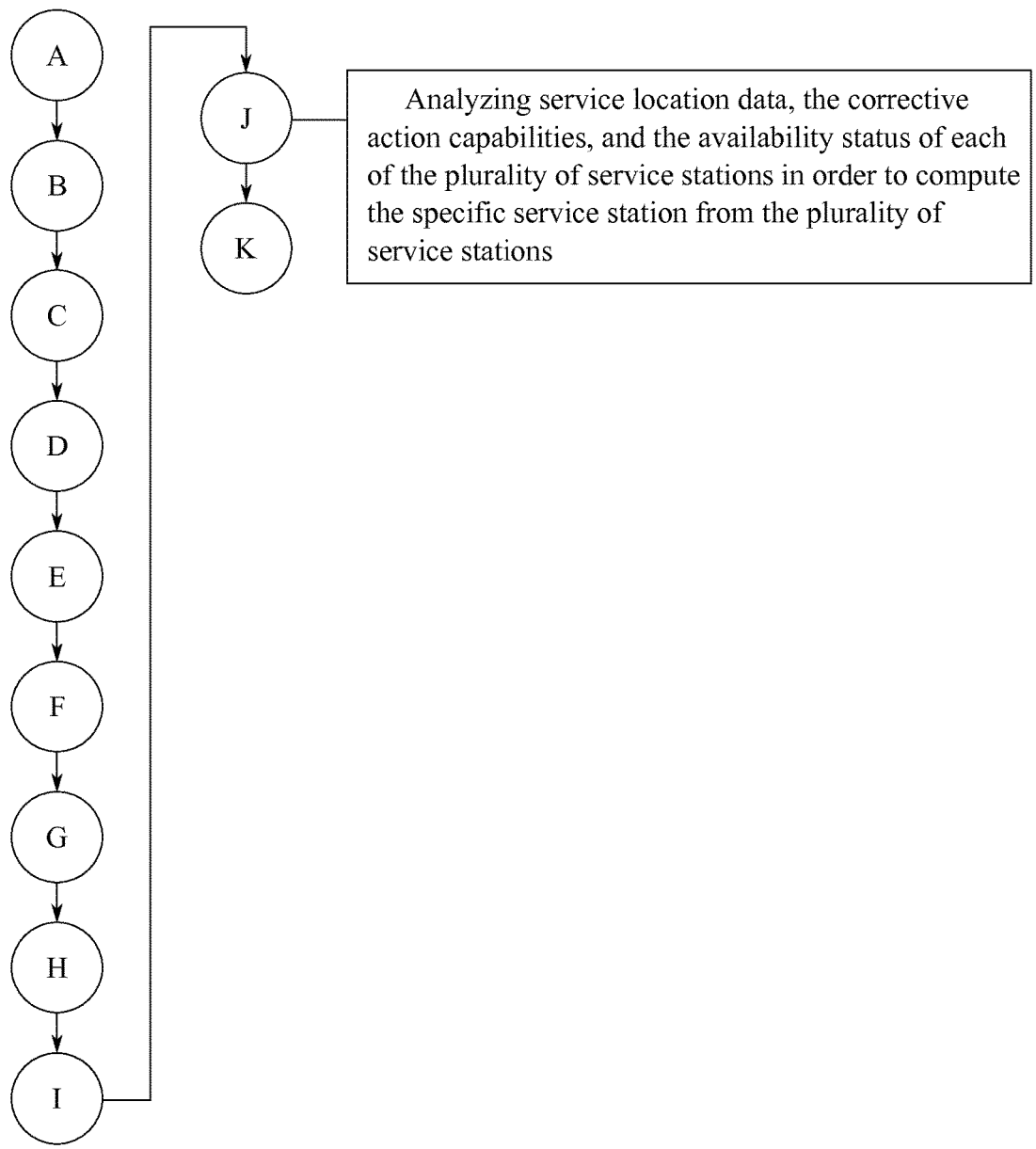
FIG. 7 is a flowchart thereof, depicting the parameters used to determine the specific service station to which the specific drone is directed.

In reference to FIG. 7, the fleet routing module then analyzes the corrective action capabilities, the availability status, and the service location data of each of the plurality of service stations in order to compute the specific service station. The fleet routing module also receives current location data from the specific drone; the current location data indicating the present location of the specific drone. The specific service station is the closest, available service station having the corrective action capabilities corresponding to the operational issue of the specific drone.

Figure 8:
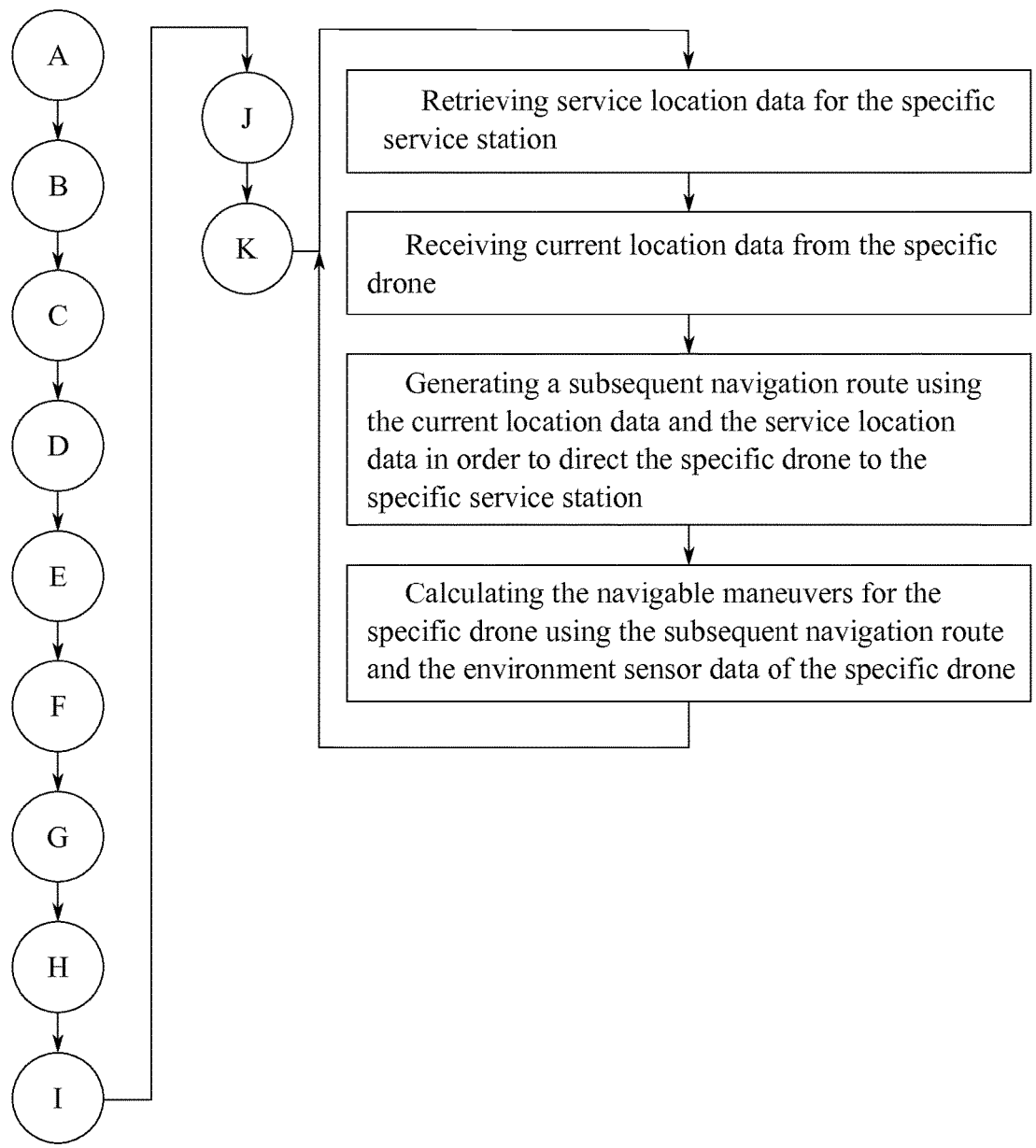
FIG. 8 is a flowchart thereof, depicting the steps for directing the specific drone to the specific service station.

In reference to FIG. 8, in order to reroute the specific drone, the fleet routing module retrieves the service location data of the specific service station. The fleet routing module then generates a subsequent navigation route using the service location data and the current location data received from the specific drone in order to direct the specific drone to the specific service station. The subsequent navigation route is then relayed to the navigation module, wherein the navigation module calculates the navigable maneuvers for the specific drone using the subsequent navigation route and the environmental sensor data of the specific drone. The navigation module then sends the subsequent navigation route and the navigable maneuvers to the specific drone.

The service station automation module is responsible for operating and maintaining the plurality of service stations. The service station automation module receives service notifications from the fleet routing module and notifies the service stations. Each of the plurality of service stations is equipped with a robotic service unit that provides the necessary components for autonomously carrying out the corrective action capabilities. Service station automation software controlling each of the plurality of service stations ensures that corrective action items all occur autonomously via the robotic service unit at each of the plurality of service stations; such corrective action items including refueling or energy exchange, motor or sensor replacement, or the replacement, addition, or removal of any other modular components. The service station automation software monitors the status of each of the plurality of service stations and keeps the fleet management software updated with statuses of the corrective action capabilities (e.g., whether a service stations has the necessary replacement components in stock) and the availability status of each of the plurality of service stations.

Figure 9:
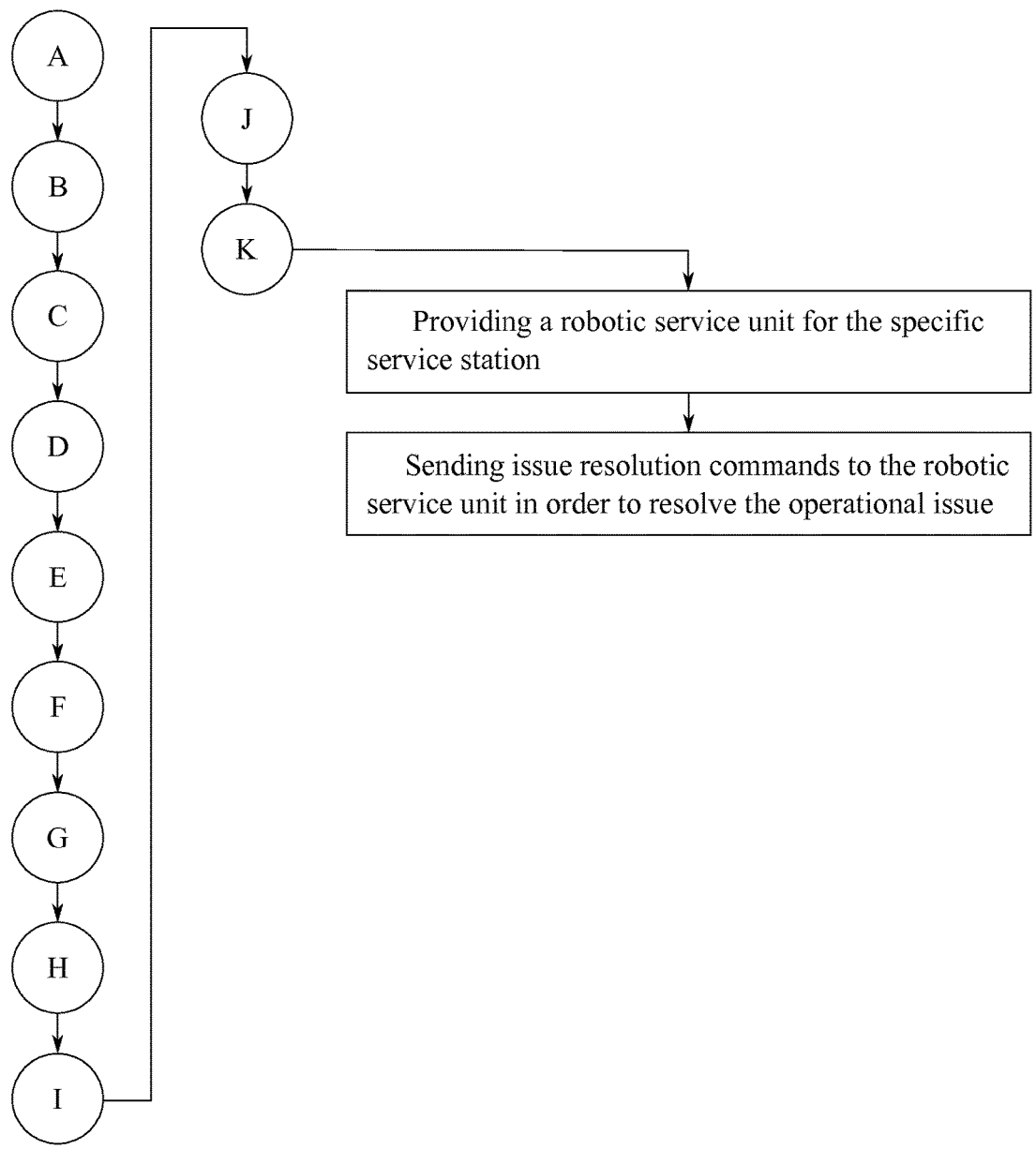
FIG. 9 is a flowchart thereof, depicting the steps for servicing the specific drone at the specific service station.

In reference to FIG. 9, once the specific drone arrives at the specific service station, the robotic service unit of the specific service station begins the actions required to resolve the operational issue. The service notification that is sent from the fleet routing module to the specific service station includes issue resolution commands that are used to instruct the robotic service unit of the specific service station. The robotic service unit of the specific service station then follows the issue resolution commands in order to resolve the operational issue of the specific drone.

Figure 10:
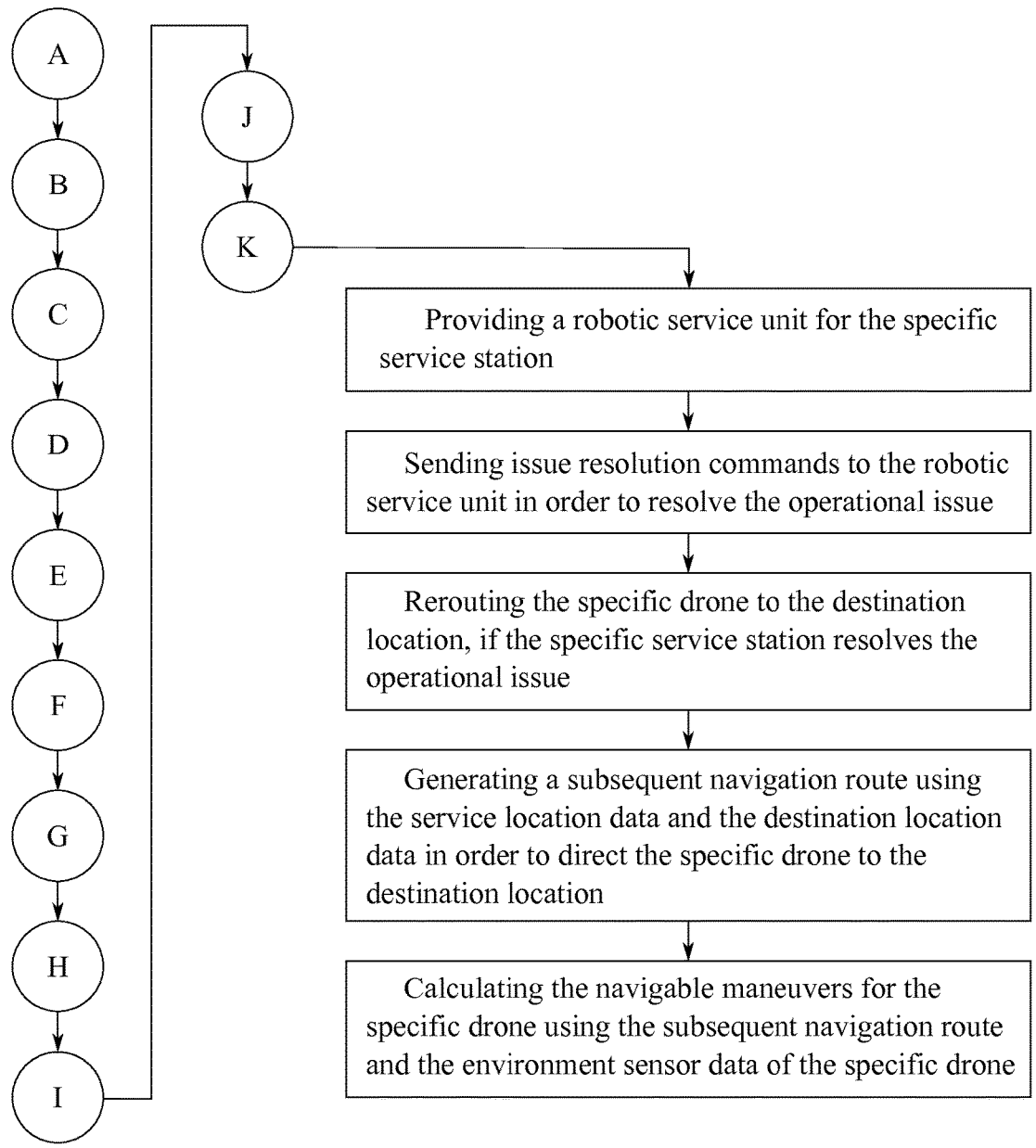
FIG. 10 is a flowchart thereof, depicting the steps for rerouting the specific drone back to the destination location, if the operational issue is resolved.
Figure 11:
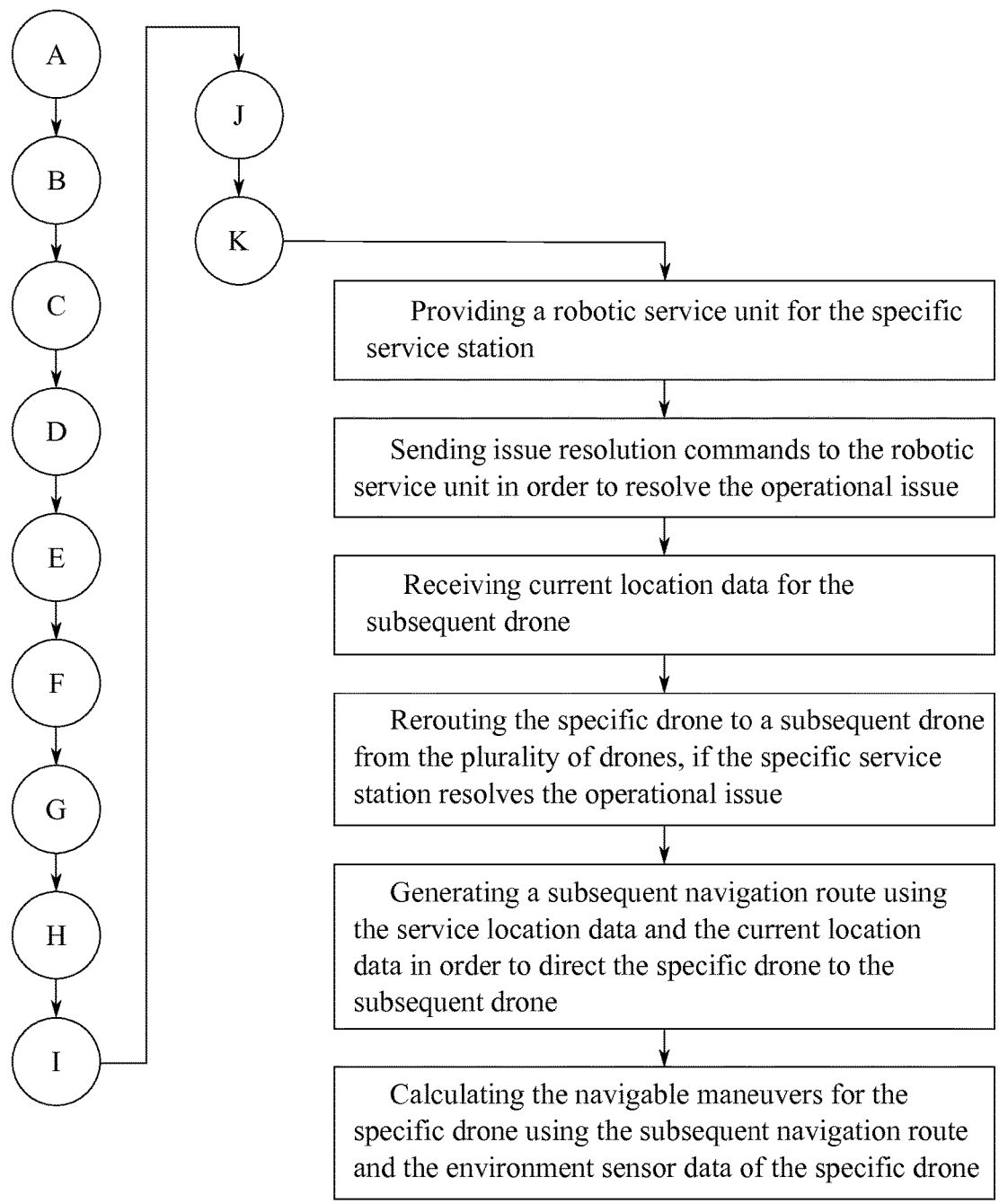
FIG. 11 is a flowchart thereof, depicting the steps for rerouting the specific drone to a subsequent drone, if the operational issue is resolved.

If the specific service station is able to resolve the operational issue, then the specific drone can be rerouted to one of two locations. The specific drone can be rerouted to the destination location as depicted in FIG. 10, or the specific drone can be rerouted to a subsequent drone from the plurality of drones as depicted in FIG. 11. The decision on where to redirect the specific drone can be based off of several factors such as the present location of the other drones, the amount of time spent servicing the specific drone, current environmental conditions, etc.

In reference to FIG. 10, to reroute the specific drone to the destination location, the fleet routing module generates a subsequent navigation route using the service location data and the destination location data. The subsequent navigation route is then relayed to the navigation module, wherein the navigation module calculates the navigable maneuvers for the specific drone using the subsequent navigation route and the environmental sensor data of the specific drone. The navigation module then sends the subsequent navigation route and the navigable maneuvers to the specific drone.

In reference to FIG. 11, to reroute the specific drone to the subsequent drone, the fleet routing module first receives current location data for the subsequent drone. The fleet routing module then generates a subsequent navigation route using the service location data and the current location data of the subsequent drone in order to direct the specific drone to the subsequent drone. The subsequent navigation route is then relayed to the navigation module, wherein the navigation module calculates the navigable maneuvers for the specific drone using the subsequent navigation route and the environmental sensor data of the specific drone. The navigation module then sends the subsequent navigation route and the navigable maneuvers to the specific drone.

Figure 15:
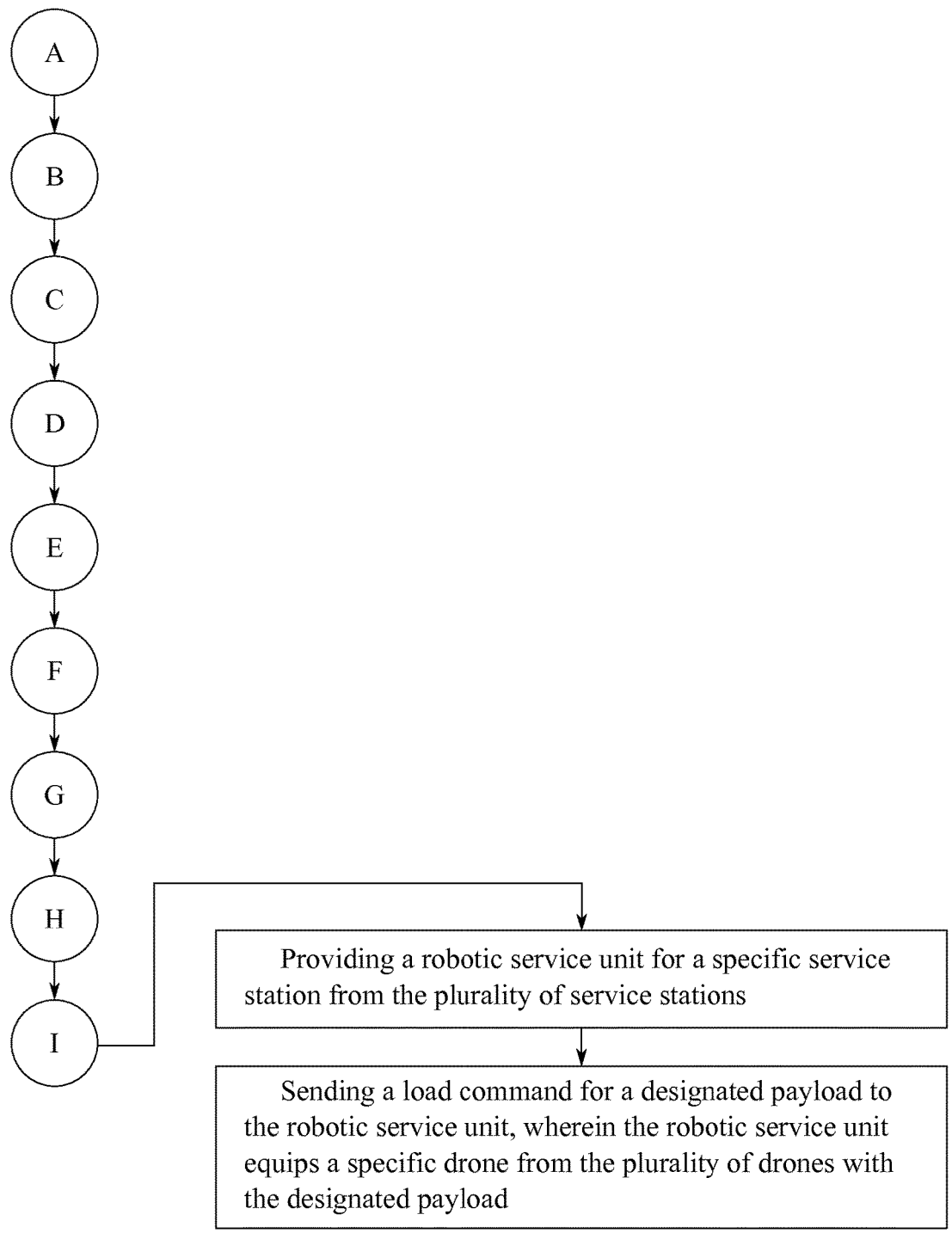
FIG. 15 is a flowchart thereof, depicting the steps for equipping the specific drone with a designated payload at the specific service station.

In reference to FIG. 15, the robotic service unit is also used in the equipping of payloads. The fleet management software can send a load command for a designated payload to the robotic service unit of the specific service station, wherein the robotic service unit of the specific service station equips the specific drone with the designated payload. In the event that the specific drone is inoperable, the load command can be transferred for a subsequent drone, wherein the robotic service unit of the specific service station equips the subsequent drone with the designated payload and the subsequent drone takes the route of the specific drone.

Figure 12:
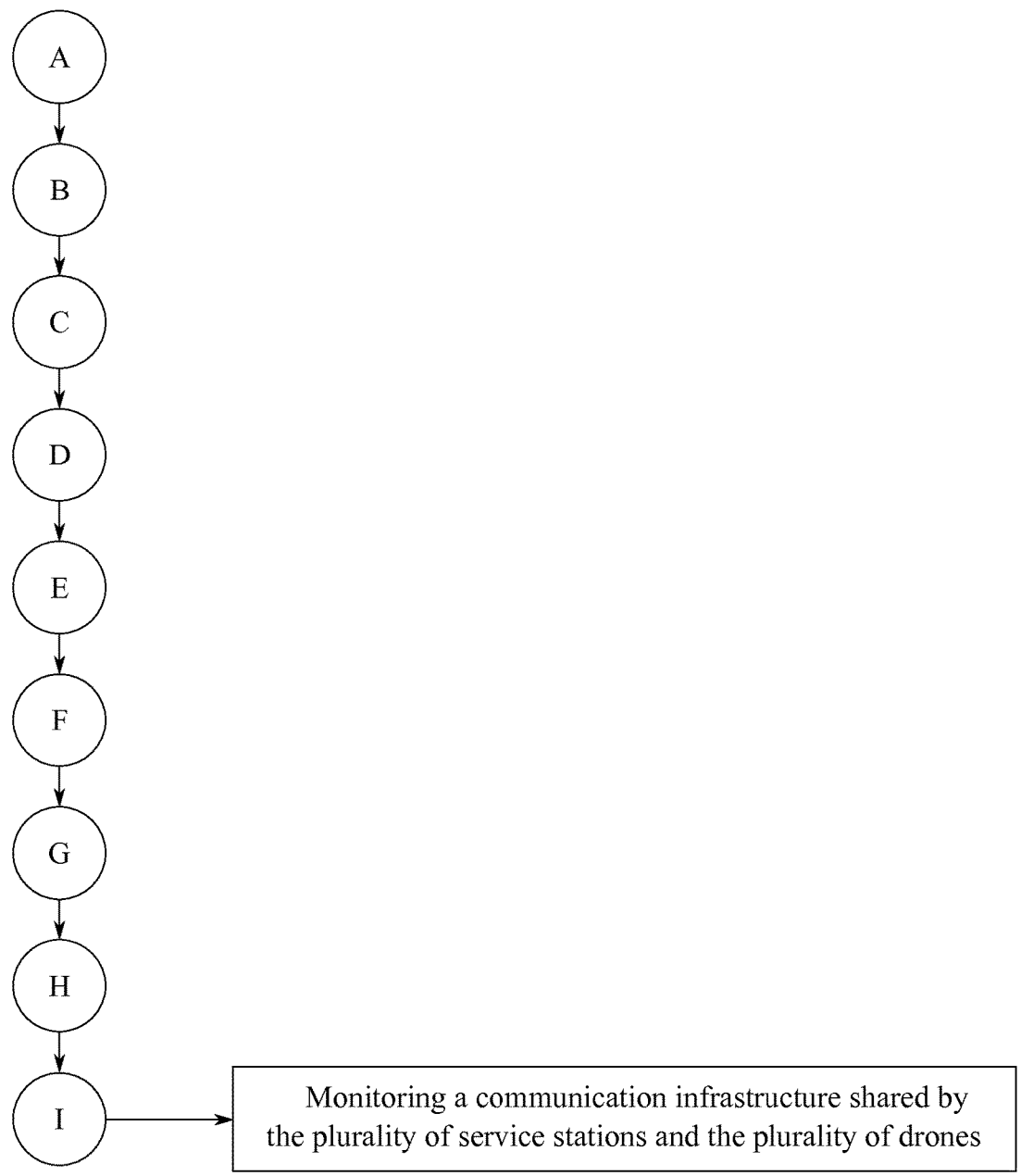
FIG. 12 is a flowchart thereof, depicting the step for monitoring the communication infrastructure.

In the three-dimensional integrated logistical system, there are many moving parts in the hardware network. Coordinating these moving parts requires the communication infrastructure to be robust and efficient as articulated by the communication module of the fleet management software. In reference to FIG. 12, the communication module monitors the communication infrastructure shared by the plurality of service stations, the plurality of drones, and the control station to ensure that communication channels are active and functioning properly, such that information can be properly shared amongst systems. The communication module ensures routing instructions from the fleeting routing module; the navigable maneuvers from the navigation module; the environmental sensor data and the internal sensor data from the unmanned system integrity monitoring module; and service location data from the service station automation module is able to be properly shared between the plurality of drones, the control station, the plurality of service stations, and any other device connected to the three-dimensional integrated logistical system.

Figure 16:
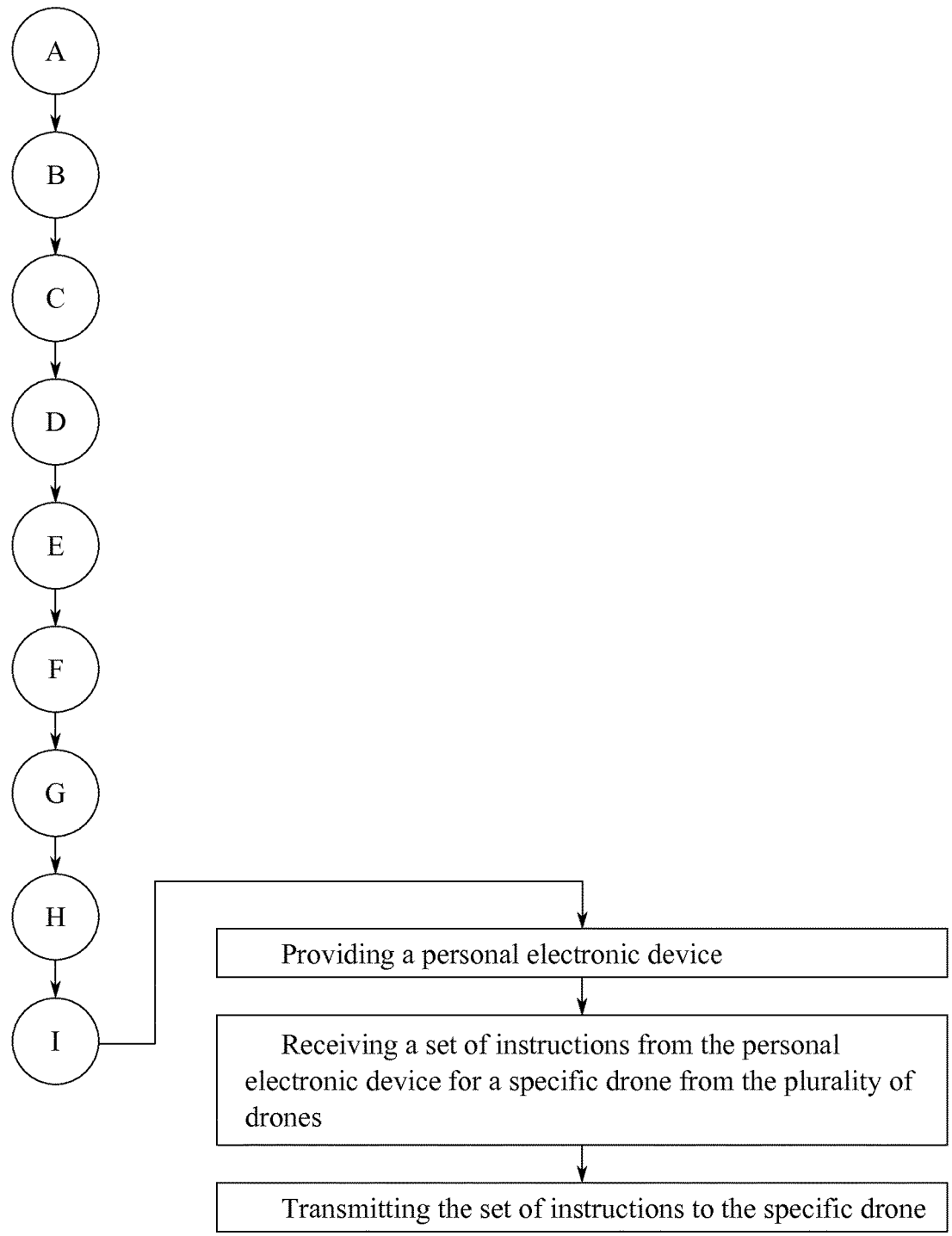
FIG. 16 is a flowchart thereof, depicting steps for controlling a specific drone through a personal electronic device.

In some embodiments of the present invention, an individual may be able to communicate with the plurality of drones through a personal electronic device. The personal electronic device is able to communicably connect, either wirelessly or by wired connection, to the communication infrastructure. The individual can then send a set of instructions to a specific drone from the plurality of drones through the personal electronic device. In reference to FIG. 16, the fleet management software receives the set of instructions for the specific drone from the personal electronic device and transmits the set of instructions to the specific drone through the communication infrastructure. For example, the plurality of drones could be deployed in a tourist location, wherein a tourist is able to connect to a nearby drone through the personal electronic device and proceed to maneuver the nearby drone and take a picture of said tourist or the surrounding environment.

Although the invention has been explained in relation to its preferred embodiment, it is to be understood that many other possible modifications and variations can be made without departing from the spirit and scope of the invention as hereinafter claimed.

What is claimed is:

1. A method for controlling a fleet of drones comprising:
    establishing a communication between a plurality of drones and a plurality of service stations;
    receiving destination location data for a destination location;
    receiving starting location data from the plurality of drones;
    generating a navigation route using the starting location data and the destination location data in order to direct the plurality of drones to the destination location;
    receiving environmental sensor data from each of the plurality of drones;

calculating navigable maneuvers for each of the plurality of drones using the navigation route and the environmental sensor data;
receiving internal sensor data from each of the plurality of drones;
monitoring the environmental sensor data and the internal sensor data for each of the plurality of drones;
monitoring corrective action capabilities and an availability status for each of the plurality of service stations;
computing a specific service station from the plurality of service stations if an operational issue is detected for a specific drone from the plurality of drones;
rerouting the specific drone to the specific service station;
monitoring a communication infrastructure shared by the plurality of service stations and the plurality of drones;
providing a plurality of environmental sensors for each of the plurality of drones;
receiving the environmental sensor data from the plurality of environmental sensors of each of the plurality of drones;
providing a plurality of internal sensors for each of the plurality of drones;
receiving the internal sensor data from the plurality of environmental sensors of each of the plurality of drones;
providing a robotic service unit for the specific service station from the plurality of service stations;
sending a load command for a designated payload to the robotic service unit, the robotic service unit equipping the specific drone from the plurality of drones with the designated payload;
providing a personal electronic device;
receiving a set of instructions from the personal electronic device for the specific drone from the plurality of drones;
transmitting the set of instructions to the specific drone; and
each of the plurality of drones being an aerial drone, an aquatic drone, a terrestrial drone or a space drone.

2. The method as claimed in claim 1 comprising:
diagnosing the operational issue from the internal sensor data of the specific drone.

3. The method as claimed in claim 1 comprising:
diagnosing the operational issue from the environmental sensor data of the specific drone.

4. The method as claimed in claim 1 comprising:
diagnosing the operational issue from the environmental sensor data of a subsequent drone from the plurality of drones.

5. The method as claimed in claim 1 comprising:
analyzing service location data, the corrective action capabilities, and the availability status of each of the plurality of service stations in order to compute the specific service station from the plurality of service stations.

6. The method as claimed in claim 1 comprising:
retrieving service location data for the specific service station;
receiving current location data from the specific drone;
generating a subsequent navigation route using the current location data and the service location data in order to direct the specific drone to the specific service station; and
calculating the navigable maneuvers for the specific drone using the subsequent navigation route and the environment sensor data of the specific drone.

7. The method as claimed in claim 1 comprising:
providing a robotic service unit for the specific service station; and
sending issue resolution commands to the robotic service unit in order to resolve the operational issue.

8. The method as claimed in claim 1 comprising:
rerouting the specific drone to the destination location,
if the specific service station resolves the operational issue.

9. The method as claimed in claim 8 comprising:
generating a subsequent navigation route using the service location data and the destination location data in order to direct the specific drone to the destination location; and
calculating the navigable maneuvers for the specific drone using the subsequent navigation route and the environment sensor data of the specific drone.

10. The method as claimed in claim 1 comprising:
rerouting the specific drone to a subsequent drone from the plurality of drones,
if the specific service station resolves the operational issue.

11. The method as claimed in claim 10 comprising:
receiving current location data for the subsequent drone;
generating a subsequent navigation route using the service location data and the current location data in order to direct the specific drone to the subsequent drone; and
calculating the navigable maneuvers for the specific drone using the subsequent navigation route and the environment sensor data of the specific drone.

* * * * *